United States Patent [19]

Ozeki

[11] Patent Number: 5,758,551

[45] Date of Patent: Jun. 2, 1998

[54] CRANKSHAFT

[75] Inventor: Hisashi Ozeki, Shizuoka-ken, Japan

[73] Assignee: Suzuki Motor Corporation, Shizuoka-ken, Japan

[21] Appl. No.: 829,336

[22] Filed: Mar. 31, 1997

Related U.S. Application Data

[63] Continuation of Ser. No. 573,724, Dec. 18, 1995, abandoned, which is a continuation of Ser. No. 166,387, Dec. 13, 1993, abandoned.

[30] Foreign Application Priority Data

Apr. 16, 1993 [JP] Japan ................... 5-113785

[51] Int. Cl.$^6$ ................................... F16C 3/06
[52] U.S. Cl. ............... 74/603; 123/192.1; 123/192.2
[58] Field of Search ............... 74/603; 123/192.1, 123/192.2

[56] References Cited

U.S. PATENT DOCUMENTS

| 3,835,728 | 9/1974 | Bernard | 74/603 |
| 4,552,104 | 11/1985 | Hara et al. | 74/603 |
| 4,785,772 | 11/1988 | Krotky et al. | 123/192.2 |
| 4,901,692 | 2/1990 | Madden | 74/603 X |
| 5,000,141 | 3/1991 | Sugano | 74/603 X |
| 5,481,942 | 1/1996 | Baek | 74/603 |

FOREIGN PATENT DOCUMENTS 4-70500  11/1992  Japan .

Primary Examiner—Charles A. Marmor
Assistant Examiner—David M. Fenstermacher
Attorney, Agent, or Firm—Flynn, Thiel, Boutell & Tanis, P.C.

[57] ABSTRACT

The weight of the first and fifth counterweights, which are located at opposite ends of a crankshaft, are set to be equal to or smaller than the weight of the remaining second to fourth counterweights. In addition, the thickness of the first and fifth counterweights are set to be equal to or smaller than the thickness of the remaining second to fourth counterweights. Moreover, the first to fifth counterweights are formed generally the same in configuration.

1 Claim, 9 Drawing Sheets

5,758,551

1

CRANKSHAFT

This application is a continuation of U.S. Ser. No. 08/573 724, filed Dec. 18, 1995, now abandoned; which is a continuation of U.S. Ser. No. 08/166,387, filed Dec. 13, 1993, now abandoned.

FIELD OF THE INVENTION

This invention relates to a crankshaft, and particularly to a crankshaft in which first to fifth counterweights are provided respectively on only first, second, fifth, eighth and ninth arms, with the weight and thickness of the first to fifth counterweights being set to predetermined values respectively.

BACKGROUND OF THE INVENTION

A crankshaft is a device for changing a reciprocal motion of a connecting rod to a rotational motion. Owing to the crankshaft, pressure acting on a piston is converted to engine torque.

In general, as a material of a crankshaft, carbon steel, special steel, special cast iron, etc. is used. There are forged crankshafts and cast crankshafts. Forged crankshafts are mostly used.

One example of such a crankshaft is disclosed in Japanese Patent Publication No. Hei 4-70500, a 60° V-type six cylinder five balance engine crankshaft as disclosed in this Publication is designed such that first to sixth crank pins thereof are arranged at spaces of 60°. With respect to the arrangement of the counterweights from outward to inward, two sets of adjacent arms of the third and fourth and the sixth and seventh, which are respectively situated in forward and backward positions relative to an intermediate fifth arm, are not provided with any counterweights. The counterweights, which are firmly secured to the first and ninth arms, are mutually balanced, and the second to fourth counterweights, which are firmly secured to the second, fifth and eighth arms, are balanced by them. The masses of the respective counterweights are such that the first and fifth counterweights of the first and ninth arms are set such that the counterweights of the first and fifth counterweights on the outermost side are larger than the counterweights of the remaining other second to fourth counterweights, and the width of the counterweights in the rotational direction when viewed in the axial direction is larger than the remaining other counterweights in the rotational direction, the second and fourth counterweights of the adjacent inner second and eighth arms being next smaller in weight.

In the conventional crankshaft, the crankshaft 104 (FIG. 12) is provided between a cylinder block and a lower crank case (not shown), through a crankshaft bearing (not shown).

As shown in FIG. 12, this crankshaft 104 has one end 104A which is to be connected to a transmission unit (not shown) and the other end 104B including a mounting surface 118 to which a flywheel (not shown) is connected.

First to fourth cylindrical journals 120-1, 120-2, 120-3 and 120-4 are provided on the crankshaft 104 from one end 104A thereof to the other end 104B, first to third crank arms 122-1, 122-2 and 122-3 as well as first and second crank pins 124-1 and 124-2 are provided between the first and second journals 120-1 and 120-2, fourth to sixth crank arms 122-4, 122-5 and 122-6 as well as third and fourth crank pins 124-3 and 124-4 are provided between the second and third journals 120-2 and 120-3, and seventh to ninth crank arms 122-7, 122-8 and 122-9 as well as fifth and sixth crank pins

2

124-5 and 124-6 are provided between the third and fourth journals 120-3 and 120-4.

Further, first to fifth counterweights 126-1, 126-2, 126-3, 126-4 and 126-5 are provided respectively on only the first, second, fifth, eighth and ninth arms 122-1, 122-2, 122-5, 122-8 and 122-9.

That is, as shown in FIG. 12, the first arm 122-1, the first pin 124-1, the second arm 122-2, the second pin 124-2, and the third arm 122-3 are arranged in order between the first and second journals 120-1 and 120-2 from the first journal 120-1 side.

Similarly, the fourth arm 122-4, the third pin 124-3, the fifth arm 122-5, the fourth pin 124-4, and the sixth arm 122-6 are arranged in order between the second and third journals 120-2 and 120-3; and the seventh arm 122-7, the fifth pin 124-5, the eight arm 122-8, the sixth pin 124-6 and the ninth arm 122-9 are arranged in order between the third and fourth journals 120-3 and 120-4.

The weight of the respective first and fifth counterweights 126-1 and 126-5, which are located at opposite ends 104A and 104B of the crankshaft 104, are larger than the weight of the remaining second to fourth counterweights 126-2, 126-3 and 126-4. The axial thickness Ta and Te of the first and fifth counterweights 126-1 and 126-5 are larger than the axial thickness Tb, Tc and Td of the remaining second to fourth counterweights 126-2, 126-3 and 126-4.

As a result, the thickness of the first and fifth counterweights of the crankshaft are larger than the thickness of the remaining second to fourth counterweights. This makes the entire length of the crankshaft large and therefore the length of the engine becomes large in the forward and backward (i.e. axial) direction. As a consequence, mountability of engine to the vehicle body becomes more difficult. This is disadvantageous in practical use. In addition, the vehicle body and engine become large in weight, the cost is increased, and it is disadvantageous from an economical view point.

The long length of the crankshaft also makes bend rigidity and twist rigidity low, and the low bend rigidity makes the bend of the crankshaft large at the time when both centers are chucked during machining. As a consequence, the degree of coaxis of each journal becomes large and therefore machining accuracy is lowered and lubricating requirements at the journal portions become more strict.

Furthermore, by setting the first and fifth counterweights, which are adapted to cancel the unbalance of the whole crankshaft, larger in weight and thickness than the remaining second to fourth counterweights, deformation of the crankshaft itself is increased or enhanced particularly at the time when high speed rotation is undergoing. As a consequence, the following inconveniences occur:

1. Since a large load acts on the crankshaft bearing which carries each journal portion, lubricating requirements become more strict.

2. Since the rigidity and strength at the housing portion for the crankshaft bearing of the cylinder block and lower crank case is required to be enhanced, the weight and cost are increased.

3. Since the crank case box for attaching the lower crank case to a lower part of the cylinder block is required to be enhanced in strength, cost is increased. This is uneconomical.

Therefore, according to the present invention, in order to obviate the above inconveniences, there is provided a crankshaft comprising first to ninth arms arranged from one end thereof to the other end through a plurality of pins, and first to fifth counterweights provided respectively on only the first, second, fifth, eighth and ninth arms, the crankshaft being improved in that the weight of the first and fifth counterweights, which are located at opposite ends of the crankshaft, are set to be equal to or smaller than the weight of the remaining second to fourth counterweights.

There is also provided a crankshaft comprising first to fourth journals arranged from one end thereof to the other end, first to third arms as well as first and second pins arranged between the first and second journals, fourth to sixth arms as well as third and fourth pins arranged between the second and third journals, seventh to ninth arms as well as fifth and sixth pins arranged between the third and fourth journals, and first to fifth counterweights provided respectively on only the first, second, fifth, eighth and ninth arms, the crankshaft being improved in that the weight of the first and fifth counterweights, which are located at opposite ends of the crankshaft, are set to be equal to or smaller than the weight of the remaining second to fourth counterweights, and the thickness of the first and fifth counterweights, which are located at opposite ends of the crankshaft, are set to be equal to or smaller than the thickness of the remaining second to fourth counterweights.

There is further provided a crankshaft comprising first to fourth journals arranged from one end thereof to the other end, first to third arms as well as first and second pins arranged between the first and second journals, fourth to sixth arms as well as third and fourth pins arranged between the second and third journals, seventh to ninth arms as well as fifth and sixth pins arranged between the third and fourth journals, and first to fifth counterweights provided respectively on only the first, second, fifth, eighth and ninth arms, the crankshaft being improved in that the weight of the first and fifth counterweights, which are located at opposite ends of the crankshaft, are set to be equal to or smaller than the weight of the remaining second to fourth counterweights, the thickness of the first and fifth counterweights, which are located at opposite ends of the crankshaft, are set to be equal to or smaller than the thickness of the remaining second to fourth counterweights, and the first to fifth counterweights are formed generally the same in configuration.

With the above-mentioned construction of the present invention, the weight of the first and fifth counterweights, which are located at opposite ends of the crankshaft, are set to be equal to or smaller than the weight of the remaining second to fourth counterweights, and the vehicle body and engine are reduced in weight.

Further, the weight of the first and fifth counterweights, which are located at opposite ends of the crankshaft, are set to be equal to or smaller than the weight of the remaining second to fourth counterweights, and the thickness of the first and fifth counterweights are set to be equal to or smaller than the thickness of the remaining second to fourth counterweights. The entire length of the crankshaft is reduced so as to reduce the length of the engine in its forward and backward direction. Moreover, mountability of engine to the vehicle body is enhanced, the weight of the vehicle body and engine are reduced, and bend rigidity and twist rigidity are increased.

Furthermore, the weight of the first and fifth counterweights, which are located at opposite ends of the crankshaft, are set to be equal to or smaller than the weight of the remaining second to fourth counterweights, and the thickness of the first and fifth counterweights are set to be equal to or smaller than the thickness of the remaining second to fourth counterweights. The first to fifth counterweights are formed generally the same in configuration. The entire length of the crankshaft is reduced to reduce the length of the engine in its forward and backward direction. Moreover, mountability of engine to the vehicle body is enhanced, the weight of the vehicle body and engine is reduced, bend rigidity and twist rigidity are increased, and to manufacture is easy.

DETAILED DESCRIPTION

Figure 1:
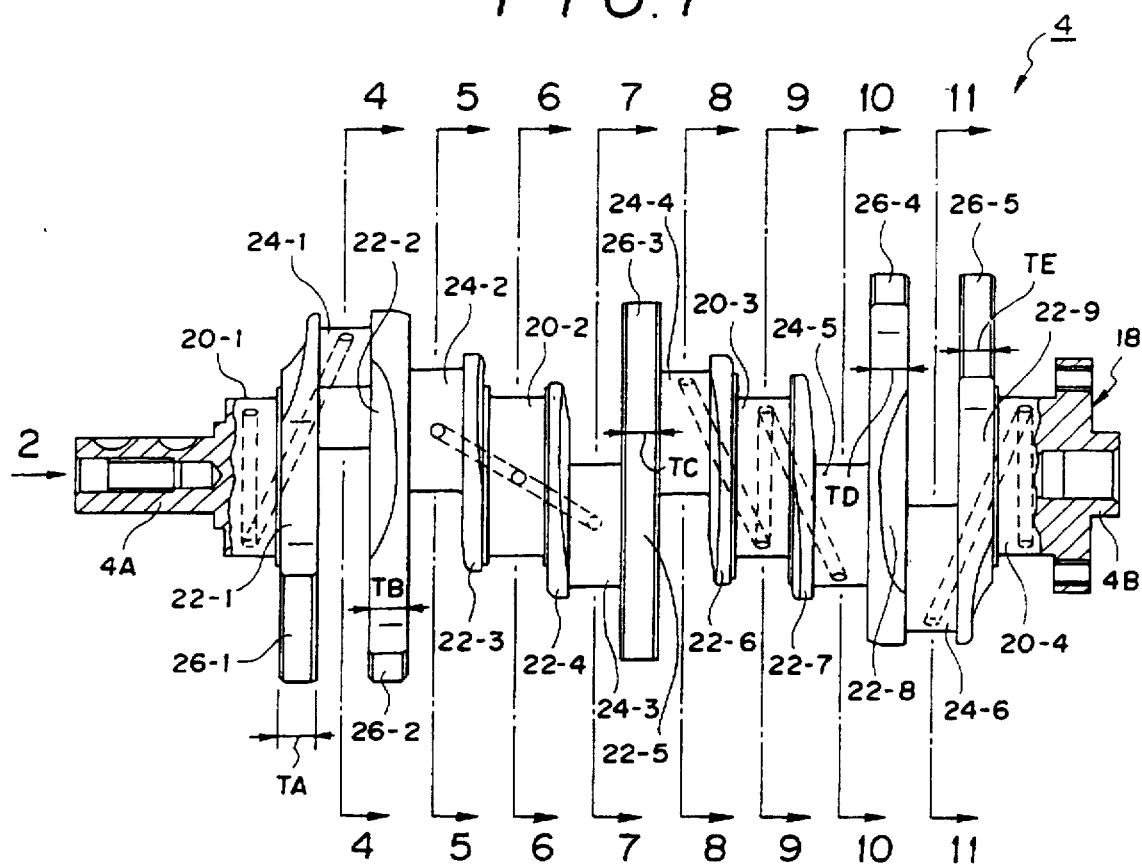
FIG. 1 is a schematic front view of a crankshaft showing one embodiment of the present invention.
Figure 2:
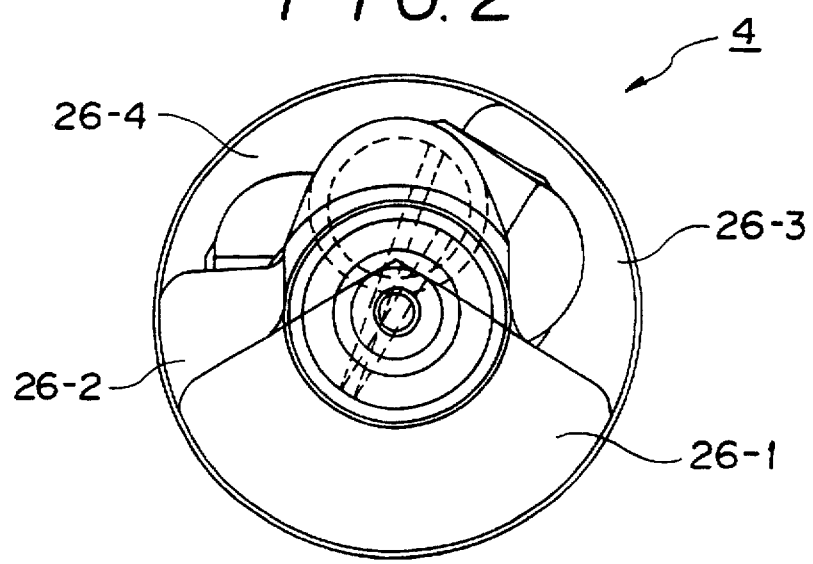
FIG. 2 is a left-hand side view taken in the direction of arrow 2 of FIG. 1.
Figure 3:
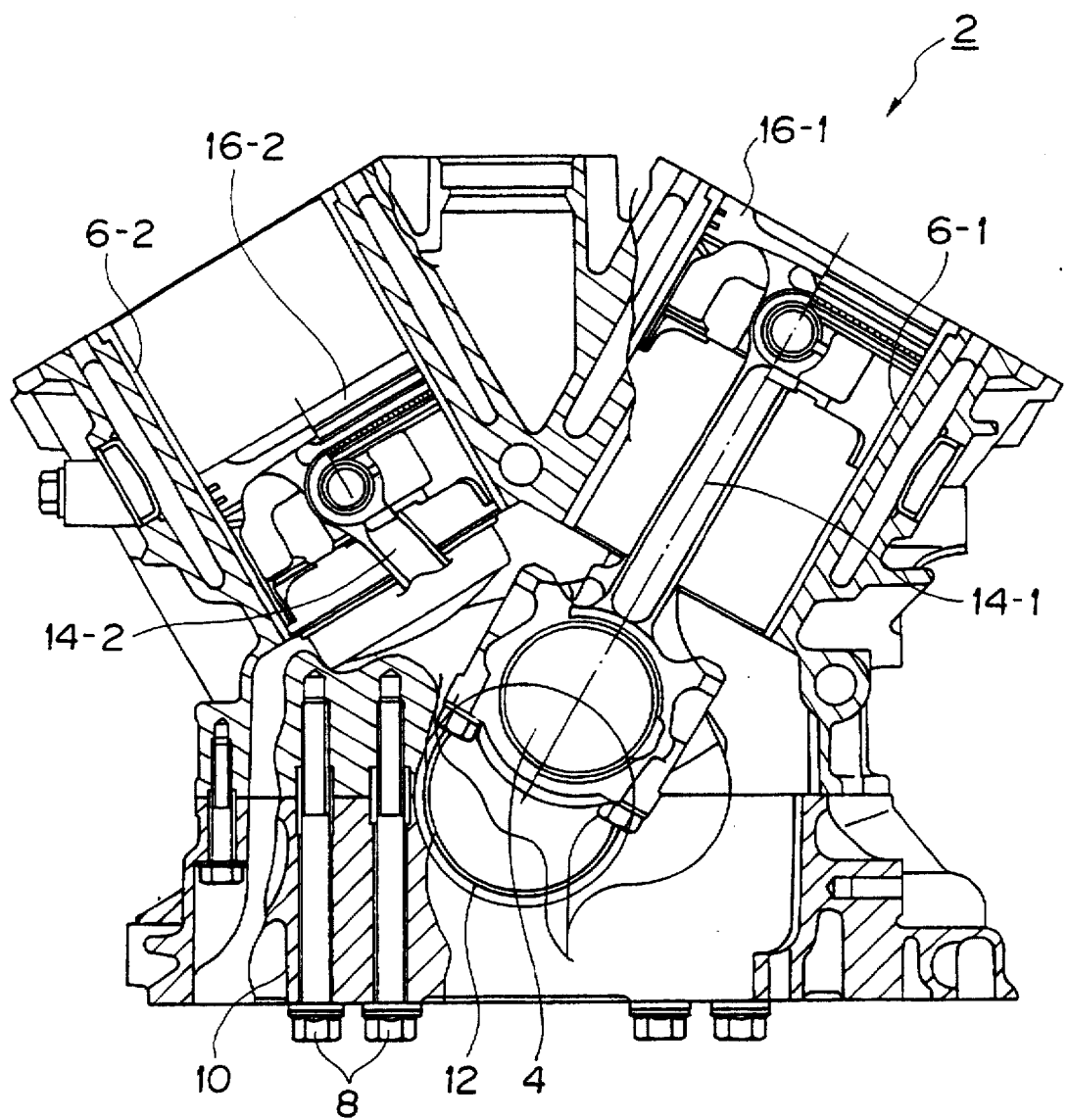
FIG. 3 is a schematic view of a cylinder block of a V-type engine.
Figure 4:
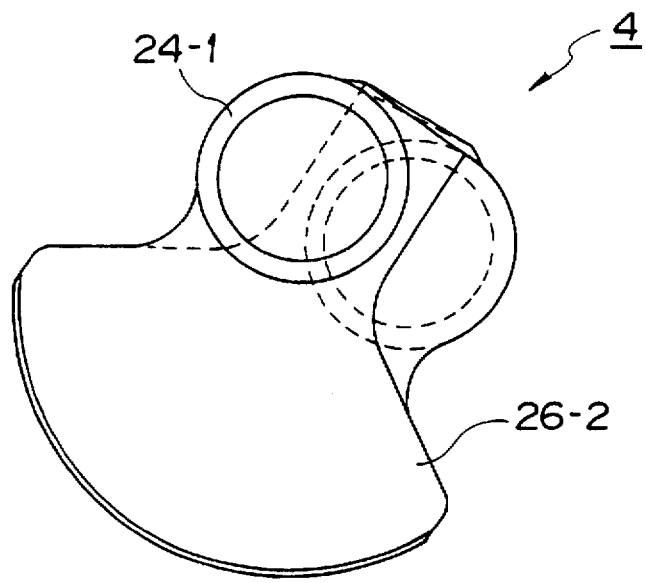
FIG. 4 is a sectional view taken on line 4—4 of FIG. 1.
Figure 5:
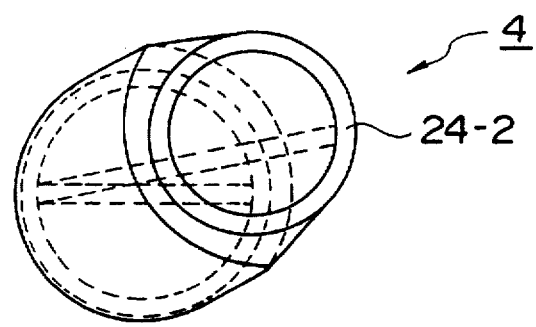
FIG. 5 is a sectional view taken on line 5—5 of FIG. 1.
Figure 6:
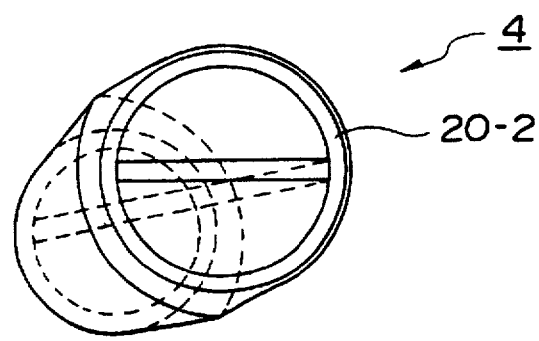
FIG. 6 is a sectional view taken on line 6—6 of FIG. 1.
Figure 7:
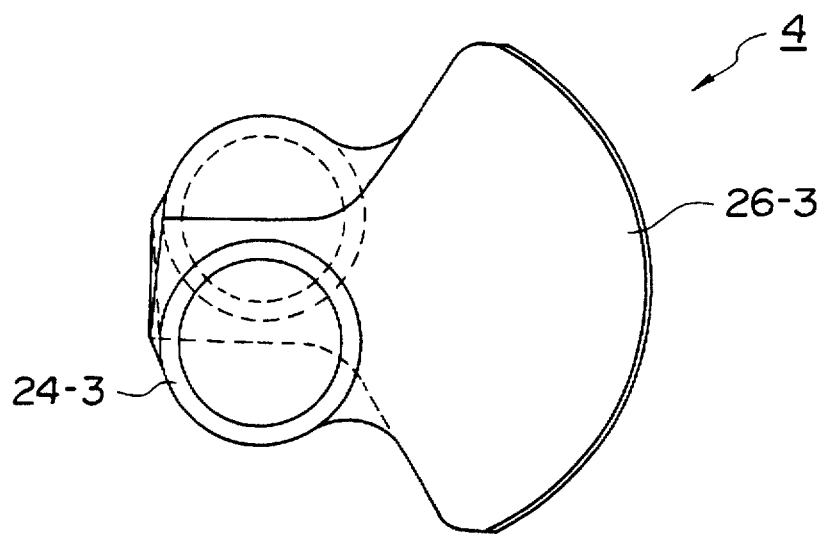
FIG. 7 is a sectional view taken on line 7—7 of FIG. 1.
Figure 8:
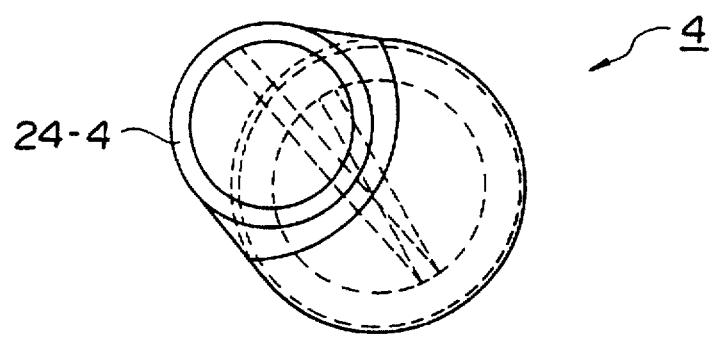
FIG. 8 is a sectional view taken on line 8—8 of FIG. 1.
Figure 9:
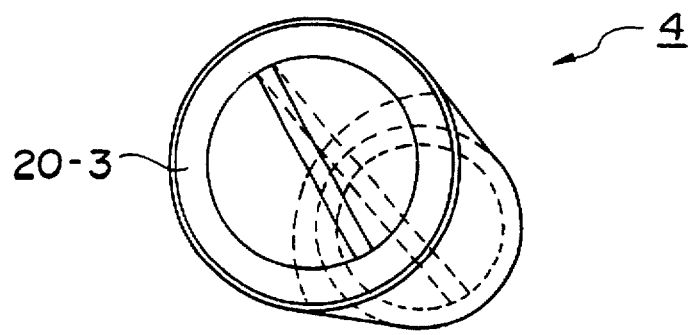
FIG. 9 is a sectional view taken on line 9—9 of FIG. 1.
Figure 10:
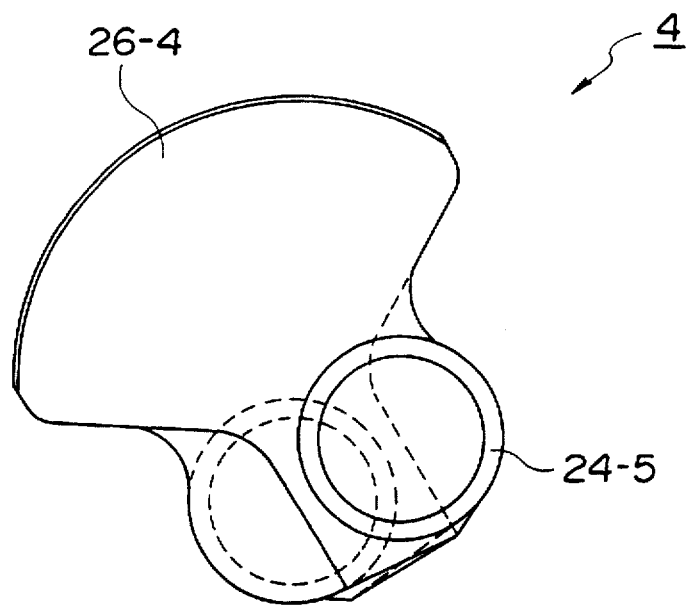
FIG. 10 is a sectional view taken on line 10—10 of FIG. 1.
Figure 11:
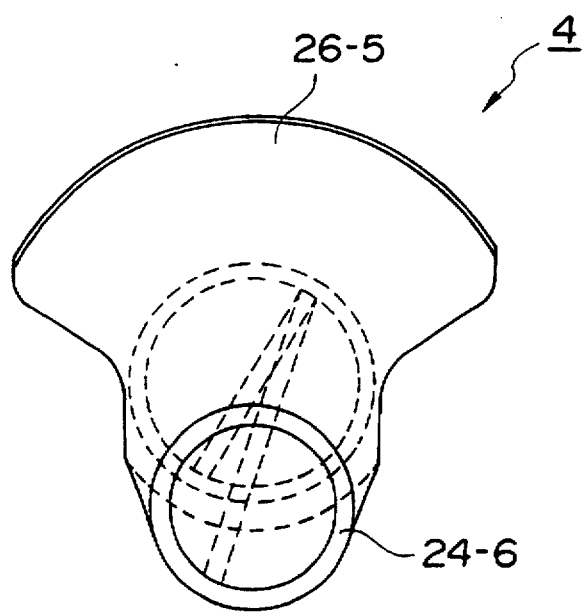
FIG. 11 is a sectional view taken on line 11—11 of FIG. 1.
Figure 12:
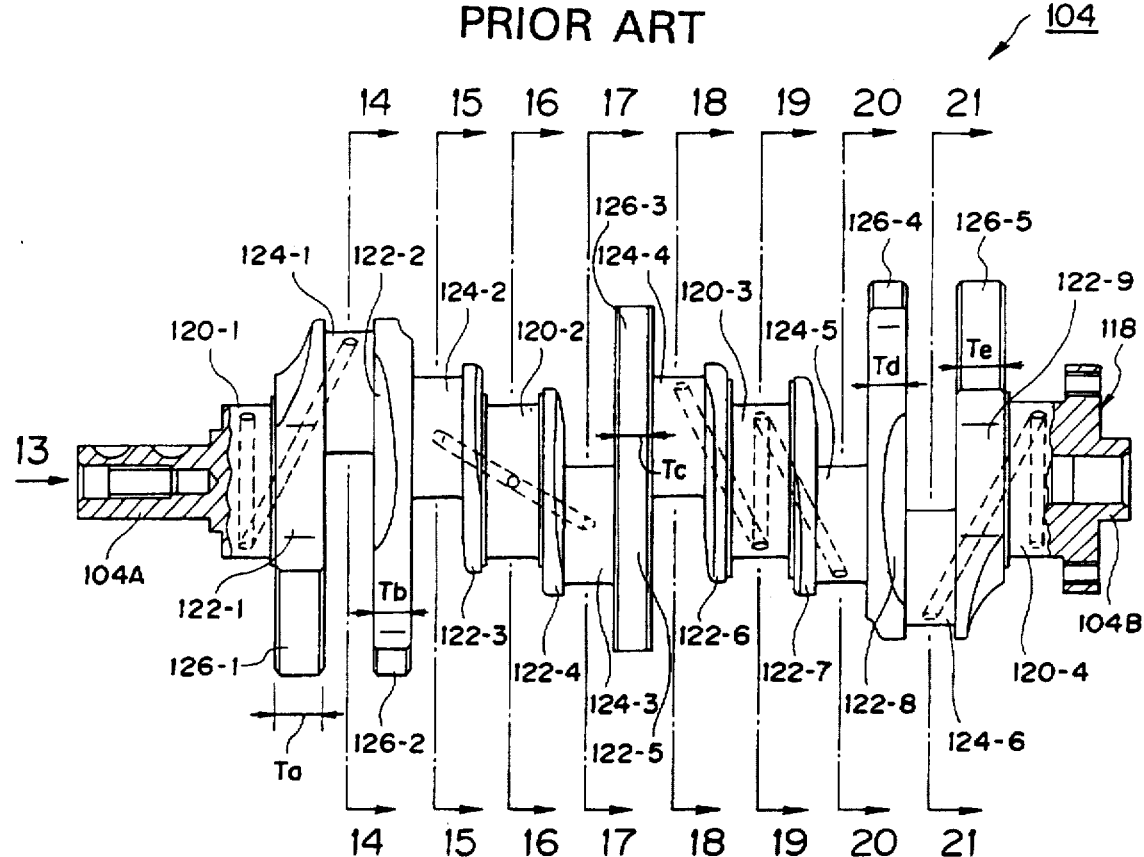
FIG. 12 is a schematic front view of a crankshaft showing the prior art.
Figure 13:
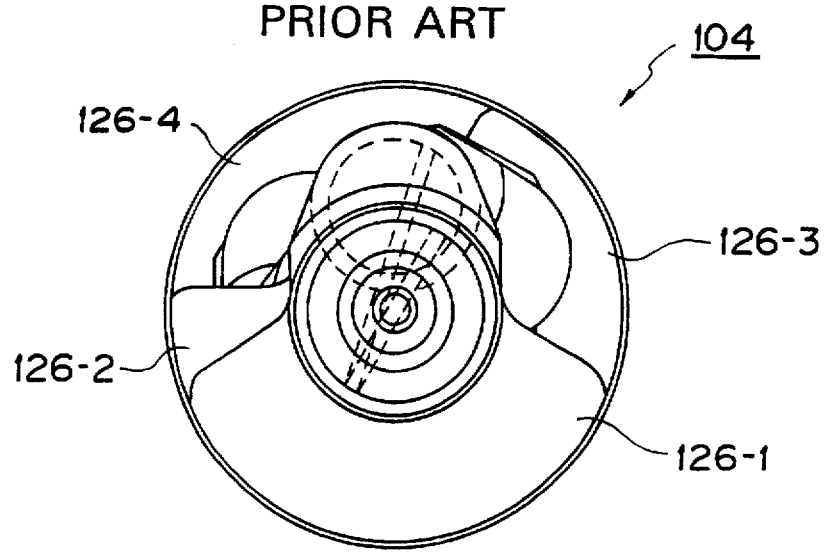
FIG. 13 is a left-hand side view taken in the direction of arrow 13 of FIG. 12.
Figure 14:
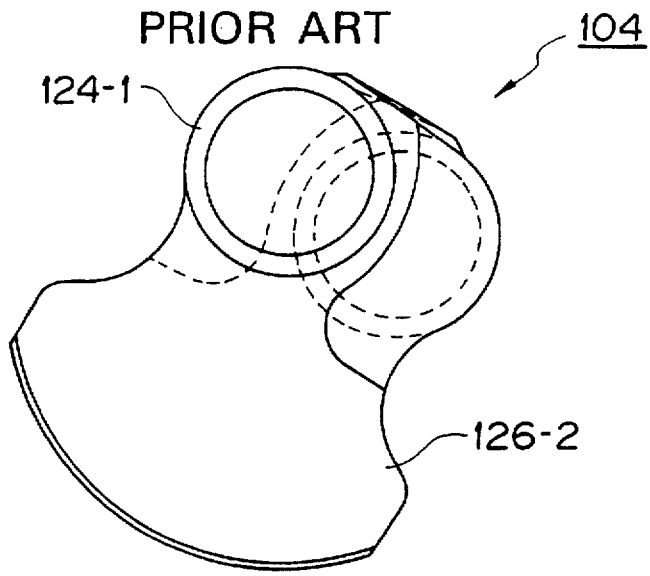
FIG. 14 is a sectional view taken on line 14—14 of FIG. 12.
Figure 15:
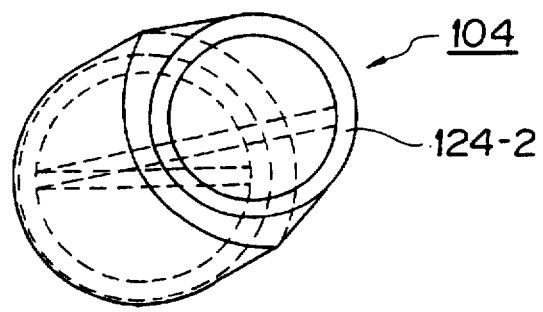
FIG. 15 is a sectional view taken on line 15—15 of FIG. 12.
Figure 16:
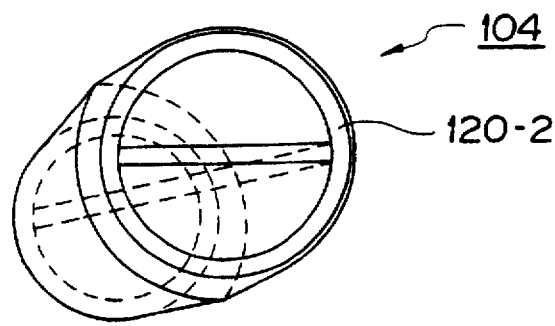
FIG. 16 is a sectional view taken on line 16—16 of FIG. 12.
Figure 17:
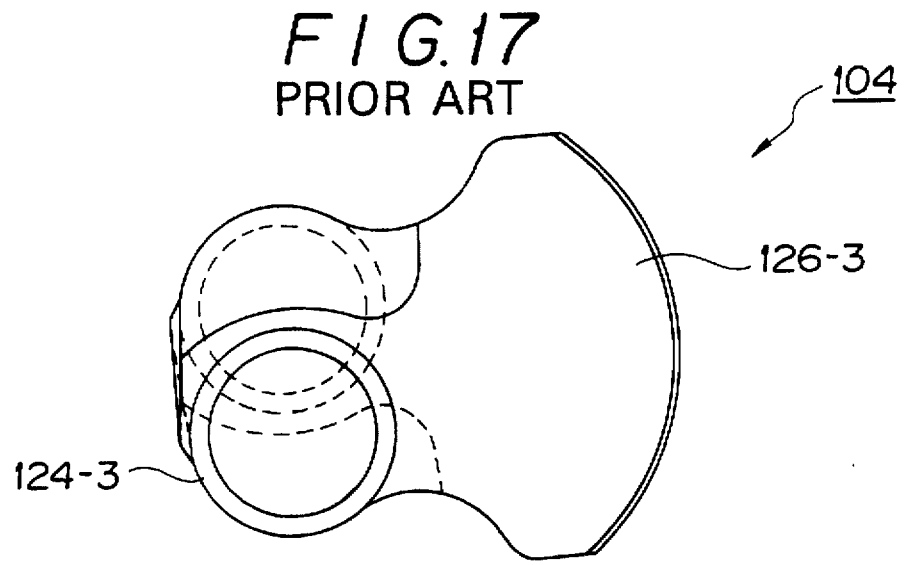
FIG. 17 is a sectional view taken on line 17—17 of FIG. 12.
Figure 18:
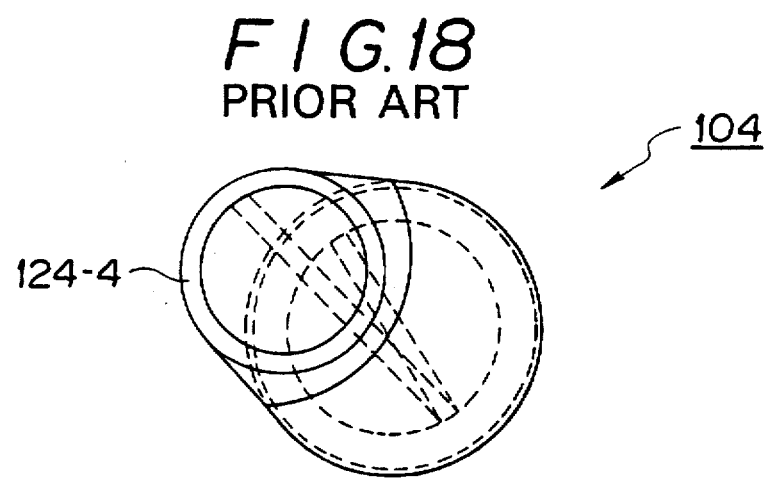
FIG. 18 is a sectional view taken on line 18—18 of FIG. 12.
Figure 19:
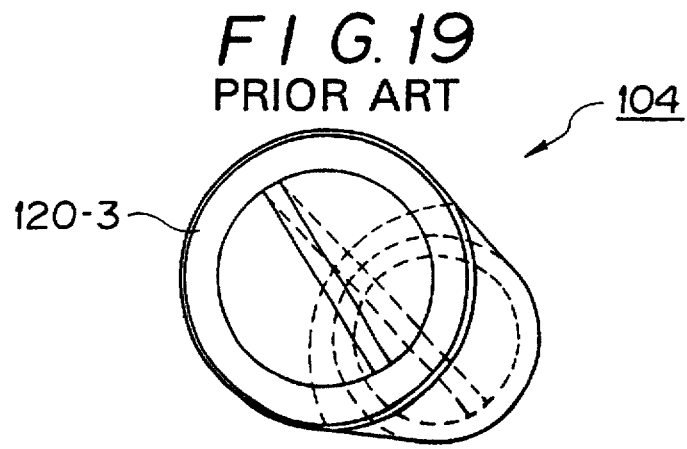
FIG. 19 is a sectional view taken on line 19—19 of FIG. 12.
Figure 20:
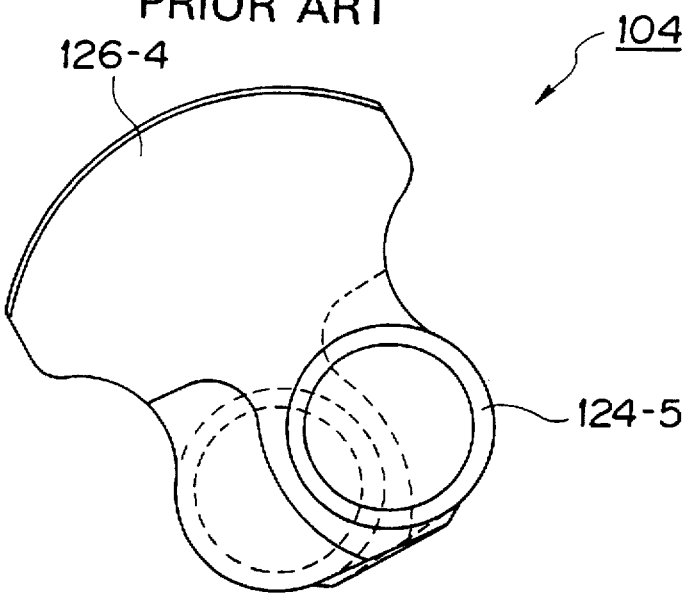
FIG. 20 is a sectional view taken on line 20—20 of FIG. 12.
Figure 21:
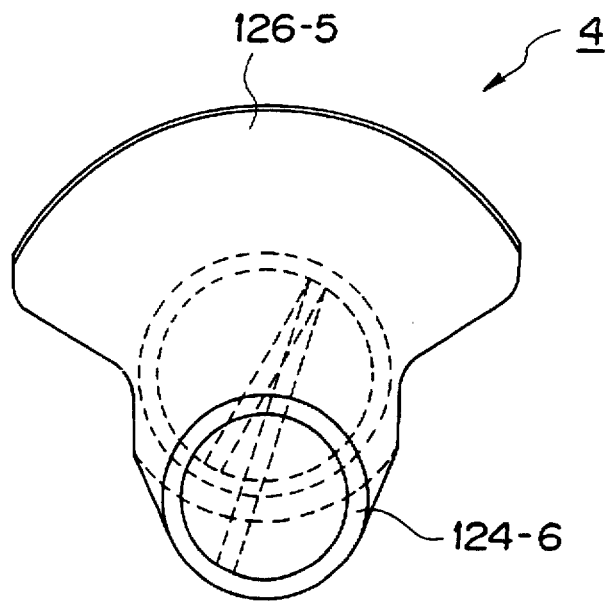
FIG. 21 is a sectional view taken on line 21—21 of FIG. 12.

FIGS. 1 to 11 show one embodiment of this invention. In FIGS. 1 and 3, reference numeral 2 denotes a cylinder block of a V-type engine (not shown), for example, and reference numeral 4 denotes a crankshaft.

As shown in FIG. 3, a number, here two, of first and second cylinders 6-1 and 6-2 are formed in an upper part of the cylinder block 2, while a lower crank case 10 is mounted on a lower part of the cylinder block 2 by bolts 8.

The crankshaft 4 is rotatably supported between the cylinder block 2 and the lower crank case 8 through crankshaft bearings 12.

First and second pistons 16-1 and 16-2 are connected to the crankshaft 4 through first and second connecting rods 14-1 and 14-2, respectively. These first and second pistons 16-1 and 16-2 are reciprocally movable within the first and second cylinders 6-1 and 6-2, respectively.

As shown in FIG. 1, the crankshaft 4 has one end 4A which is to be connected to a transmission unit (not shown), and the other end 4B including a mounting surface 18 to which a flywheel (not shown) is connected.

First to fourth journals 20-1, 20-2, 20-3 and 20-4 are arranged on the crankshaft 4 from the one end 4A to the other end 4B, first to third crank arms 22-1, 22-2 and 22-3 as well as first and second crank pins 24-1 and 24-2 are arranged between the first and second journals 20-1 and 20-2, fourth to sixth crank arms 22-4, 22-5 and 22-6 as well as third and fourth crank pins 24-3 and 24-4 are arranged between the second and third journals 20-2 and 20-3, and seventh to ninth crank arms 22-7, 22-8 and 22-9 as well as fifth and sixth crank pins 24-5 and 24-6 are arranged between the third and fourth journals 20-3 and 20-4.

Further, first to fifth counterweights 26-1, 26-2, 26-3, 26-4 and 26-5 are mounted respectively to only the first, second, fifth, eighth and ninth arms 22-1, 22-2, 22-5, 22-8 and 22-9.

That is, as shown in FIG. 1, the first arm 22-1, the first pin 24-1, the second arm 22-2, the second pin 24-2, and the third arm 22-3 are arranged in order between the first and second journals 20-1 and 20-2 from the first journal 20-1 side. Similarly, the fourth arm 22-3, the third pin 24-3, the fifth arm 22-5, the fourth pin 24-4, and the sixth arm 22-6 are arranged in order between the second and third journals 20-2 and 20-3; while the seventh arm 22-7, the fifth pin 24-5, the eighth arm 22-8, the sixth pin 24-6, and the ninth arm 22-9 are arranged in order between the third and fourth journals 20-3 and 20-4.

The weight of the first and fifth counterweights 26-1 and 26-5, which are located at opposite ends 4A and 4B of the crankshaft 4, are set to be equal to or smaller than the weight of the remaining second to fourth counterweights 26-2, 26-3 and 26-4.

Similarly, the thickness TA and TE of the respective first and fifth counterweights 26-1 and 26-5 are set to be equal to or smaller than the thickness TB, TC and TD of the remaining second to fourth counterweights 26-2, 26-3 and 26-4, respectively.

Furthermore, the first to fifth counterweights 26-1, 26-2, 26-3, 26-4, and 26-5 are formed generally the same in configuration.

More specifically, the weight of the respective first and fifth counterweights 26-1 and 26-5, for example, are set to be slightly smaller than the weight of the remaining second to fourth counterweights 26-2, 26-3 and 26-4, while the axial thickness TA and TE of the respective first and fifth counterweights 26-1 and 26-5 are set to be slightly smaller than the axial thickness TB, TC and TD of the remaining second to fourth counterweights 26-2, 26-3 and 26-4.

Furthermore, the first to sixth pins 24-1, 24-2, 24-3, 24-4, 24-5 and 24-6 are mutually arranged at angular intervals of 60°. The first and fifth counterweights 26-1 and 26-5, which are firmly secured respectively to the first and ninth arms 22-1 and 22-9, are arranged in such a manner as to cancel the unbalance of the whole crankshaft 4, while the second to fourth counterweights 26-2, 26-3 and 26-4, which are firmly secured respectively to the second, fifth and eighth arms 22-2, 22-5 and 22-8, are arranged in such a manner as to cancel the unbalance of the first to sixth pins 24-1, 24-2, 24-3, 24-4, 24-5 and 24-6.

The operation of the improved crankshaft will now be described.

In the crankshaft 4, since the first to fifth counterweights 26-1, 26-2, 26-3, 26-4 and 26-5 are mutually well balanced, there can be obtained a smooth rotational motion, as in the prior art.

Owing to the above-mentioned arrangement, the thickness TA and TE of the first and fifth counterweights 26-1 and 26-5 of the crankshaft 4 are made smaller than the thickness TB, TC and TD of the remaining second to fourth counterweights 26-2, 26-3 and 26-4. As a result, the entire length of the crankshaft 4 can be made smaller than theretofore obtainable. As a consequence, since the V-type engine can be reduced in length in the forward and backward direction, the mountability of the V-type engine to the vehicle body is enhanced. This is advantageous in practical use. Moreover, the vehicle body and V-type engine can be reduced in weight. Since the cost can be reduced, it is advantageous from an economical viewpoint.

Since the entire length of the crankshaft 4 is reduced, there can be obtained, in addition to the above-mentioned operational effects, such significant effects that bend rigidity and twist rigidity are enhanced. Moreover, owing to the enhancement of the bend rigidity, the bending amount of the crankshaft is reduced at the time when both centers are chucked during machining. Since the degree of coaxis for each journal is reduced, machining accuracy is enhanced. As a result, lubricating conditions at the journal parts are enhanced.

Furthermore, by setting the first and fifth counterweights 26-1 and 26-5, which are adapted to cancel the unbalance of the whole crankshaft 4, slightly smaller in weight and thickness than the remaining second to fourth counterweights 26-2, 26-3 and 26-4, the amount of deformation of the crankshaft 4 itself is reduced, particularly at high speed rotation. As a consequence, the following effects are obtained:

1. Since the load acting on the crankshaft bearing 12 which carries each journal portion is reduced, the lubricating condition becomes more favorable.

2. Since the cost of material (unit cost of material) can be reduced owing to the reduction of the load at the time when the crankshaft bearing 12 is formed, cost can be reduced.

3. Since the rigidity and strength at the housing portion for the crankshaft bearing 12 of the cylinder block 2 and lower crank case 10 can be reduced, weight and cost can be reduced.

4. Since the load applied to the crankshaft bearing 12 is reduced, the strength of the crank case bolts 8 for mounting the lower crank case 10 to a lower part of the cylinder block 2 can be reduced and, as a result, a cost reduction can be obtained.

Since the first to fifth counterweights 26-1, 26-2, 26-3, 26-4 and 26-5 are formed generally the same in configuration, they are easy to manufacture. Since mass production is available, this is advantageous from an economical viewpoint.

The present invention is not limited to the above-mentioned embodiment, and various changes and modifications can be made.

For example, in the described embodiment, although the weight of the first and fifth counterweights are set to be slightly smaller than the weight of the remaining counterweights and the thickness of the first and fifth counterweights are set to be slightly smaller than the thickness of the remaining second to fourth counterweights, the first to fifth counterweights can all be formed the same in weight and thickness.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A crankshaft for a V-type six-cylinder engine, said crankshaft comprising first to fourth journals arranged coaxially in series extending from one end of said crankshaft to the other end thereof along a rotational axis, first through ninth crank arms projecting radially outwardly from the rotational axis of the crankshaft and being arranged axially in series from said one end toward the other end of said crankshaft, and first to sixth crank pins arranged axially in series extending from said one end toward said other end thereof, each said crank pin having a pin axis offset radially from said rotational axis and mutually disposed at angular intervals of 60°, and being arranged between and fixedly joined between an axially adjacent pair of said crank arms, said first to third crank arms as well as said first and second crank pins being arranged between said first and second journals, said fourth to sixth crank arms as well as said third and fourth crank pins being arranged between said second and third journals, said seventh to ninth crank arms as well as the fifth and sixth crank pins being arranged between the third and fourth journals, and first to fifth counterweights provided respectively only on said first, second, fifth, eighth and ninth crank arms, said first and fifth counterweights further being located adjacent opposite ends of said crankshaft and extending radially away from said rotational axis in opposite first and second radial directions, said second, third and fourth counterweights extending radially away from said rotational axis in respective third, fourth and fifth radial directions, each adjacent pair of said third, fourth and fifth radial directions oriented so as to define a 120° angle therebetween, the remaining crank arms being free of counterweights, said first to fifth counterweights being imperforate plates having generally the same configuration wherein the weight of the respective first and fifth counterweights is smaller than the weight of the second to fourth counterweights, and wherein the axial thickness of the respective first and fifth counterweights is equal to or smaller than the axial thickness of the second to fourth counterweights respectively.

* * * * *